(12) United States Patent
Parvania et al.

(10) Patent No.: US 12,715,328 B2
(45) Date of Patent: Aug. 25, 2026

(54) HIERARCHICAL COMBINATION OF ARTIFICIAL INTELLIGENCE AND OPTIMIZATION FOR THE OPERATION OF POWER SYSTEMS

(71) Applicant: University of Utah, Salt Lake City, UT (US)

(72) Inventors: Masood Parvania, Salt Lake City, UT (US); Mohammad Mehdi Hosseini, Salt Lake City, UT (US); Luis Fernando Rodriguez Garcia, Salt Lake City, UT (US); Avishan Bagherinezhad, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 929 days.

(21) Appl. No.: 18/078,267

(22) Filed: Dec. 9, 2022

(65) Prior Publication Data

US 2024/0029093 A1 Jan. 25, 2024

Related U.S. Application Data

(60) Provisional application No. 63/394,818, filed on Aug. 3, 2022, provisional application No. 63/389,594, filed on Jul. 15, 2022.

(51) Int. Cl.
*B60L 53/62* (2019.01)
*B60L 53/64* (2019.01)
(Continued)

(52) U.S. Cl.
CPC ............... *B60L 53/62* (2019.02); *B60L 53/64* (2019.02); *B60L 53/66* (2019.02); *B60W 60/001* (2020.02);
(Continued)

(58) Field of Classification Search
CPC .......... B60L 53/62; B60L 53/64; B60L 53/66; B60L 2240/62; B60L 2260/46;
(Continued)

(56) References Cited

U.S. PATENT DOCUMENTS 8,037,010 B2 10/2011 Jaros et al.
10,663,308 B2 5/2020 Chase et al.
(Continued)

FOREIGN PATENT DOCUMENTS

CN 106410799 B * 4/2019 ................ H02J 3/28
CN 110458443 A * 11/2019 ............ G06Q 50/06
(Continued)

OTHER PUBLICATIONS

Fan et al., "Optimal Scheduling of Microgrid Based on Deep Deterministic Policy Gradient and Transfer Learning", 2021, Microgrid Energy Management. (Year: 2021).*
(Continued)

*Primary Examiner* — Mohammad Ali
*Assistant Examiner* — Kelvin Booker
(74) *Attorney, Agent, or Firm* — Workman Nydegger

(57) ABSTRACT

A computer system for real-time coordinated operation of power distribution systems and electric vehicles identifies a set of integrated hybrid resources (IHRs), wherein each IHR within the set of IHRs comprises one or more of: energy storage (ES) systems, solar generating units, electric vehicles (EVs), and/or inflexible loads. The computer system executes, at an IHR selected from the set of IHRs, a deep deterministic policy gradient (DDPG) algorithm, the DDPG algorithm utilizing a critic deep neural network and an actor deep neural network. The critic deep neural network estimates a Q-value of an action for a given state, and the actor deep neural network estimates a best action for the given state. Based upon an output of the DDPG algorithm, the
(Continued)

computer system generates a charging schedule for the ES systems and the EVs within the IHR.

13 Claims, 5 Drawing Sheets

(51) Int. Cl.
*B60L 53/66* (2019.01)
*B60W 60/00* (2020.01)
*G01C 21/34* (2006.01)
*G06Q 30/02* (2023.01)
*G06Q 30/0201* (2023.01)
*G06Q 50/06* (2024.01)

(52) U.S. Cl.
CPC ..... *G01C 21/3438* (2013.01); *G06Q 30/0206* (2013.01); *G06Q 50/06* (2013.01)

(58) Field of Classification Search
CPC ....... B60L 53/67; B60L 53/68; B60W 60/001; G01C 21/3438; G01C 21/3469; G01C 21/3667; G06Q 30/0206; G06Q 50/06; Y02T 10/70; Y02T 10/7072; Y02T 90/12
See application file for complete search history.

(56) References Cited

U.S. PATENT DOCUMENTS

| | | | | |
|---|---|---|---|---|
| 10,843,586 | B2 * | 11/2020 | Al-Awami | B60L 55/00 |
| 11,327,806 | B1 * | 5/2022 | Nagaraja | G06F 16/22 |
| 2021/0110323 | A1 | 4/2021 | Munoz et al. | |
| 2022/0083378 | A1 * | 3/2022 | Morris | G06F 9/5011 |
| 2022/0209533 | A1 | 6/2022 | Ma et al. | |

FOREIGN PATENT DOCUMENTS

| | | | | |
|---|---|---|---|---|
| CN | 110535146 | A | * 12/2019 | H02J 3/1871 |
| CN | 111351180 | A | * 6/2020 | G06N 3/045 |
| CN | 111725836 | A | * 9/2020 | G06N 3/045 |
| CN | 111934335 | A | * 11/2020 | H02J 3/322 |
| CN | 112706648 | A | * 4/2021 | H02J 7/42 |
| CN | 113837654 | A | * 12/2021 | H02J 3/466 |
| CN | 113935463 | A | * 1/2022 | G06N 3/04 |
| KR | 20190133567 | A | * 12/2019 | G06Q 10/04 |
| KR | 20220100226 | A | * 7/2022 | H04N 21/8456 |
| TW | 1767525 | B | * 6/2022 | G06N 20/00 |
| WO | WO-2020250012 | A1 | * 12/2020 | B60L 58/16 |

OTHER PUBLICATIONS

Levy et al., "Hierarchical Actor-Critic", Feb. 2018, Department of Computer Science, Boston University, Boston, MA, (Year: 2018).*
Jin et al., "Optimal Policy Characterization Enhanced Actor-Critic Approach for Electric Vehicle Charging Scheduling in a Power Distribution Network", Mar. 2021, IEEE Transactions on Smart Grid, vol. 12, No. 2. (Year: 2021).*
Li et al., "Deep Deterministic Policy Gradient Based Dynamic Power Control for Self-Powered Ultra-Dense Networks", 2018 IEEE. (Year: 2018).*
He et al., "A novel hierarchical predictive energy management strategy for plug-in hybrid electric bus combined with deep deterministic policy gradient", 2022, Journal of Energy Storage 52 (2022) 104787. (Year: 2022).*
Baghaee et al., "Power Calculation Using RBF Neural Networks to Improve Power Sharing of Hierarchical Control Scheme in Multi-DER Microgrids", Dec. 2016, IEEE Journal of Emerging and Selected Topics in Power Electronics, vol. 4, No. 4. (Year: 2016).*
Cao et al., "Smart Online Charging Algorithm for Electric Vehicles via Customized Actor-Critic Learning", Jan. 2022, IEEE Internet of Things Journal, vol. 9, No. 1. (Year: 2022).*
Cao et al., "Reinforcement Learning From Hierarchical Critics", Feb. 2023, IEEE Transactions on Neural Networks and Learning Systems, vol. 34, No. 2. (Year: 2023).*
Alabbas et al., "Deep Deterministic Policy Gradient Data-Driven Approach for EV Charging and Discharging Scheduling Problem", 2024, IEEE. (Year: 2024).*
Wang et al., "AHAC: Actor Hierarchical Attention Critic for Multi-Agent Reinforcement Learning", Oct. 2020, 2020 IEEE International Conference on Systems, Man, and Cybernetics (SMC). (Year: 2020).*
Wang et al., "Deep Deterministic Policy Gradient With Compatible Critic Network", Aug. 2023, IEEE Transactions on Neural Networks and Learning Systems, vol. 34, No. 8. (Year: 2023).*
Liu et al., "Power Allocation in Ultra-Dense Networks Through Deep Deterministic Policy Gradient", Dec. 2022, IEEE Wireless Communications Letters, vol. 11, No. 12. (Year: 2022).*
Samende et al., "Multi-Agent Deep Deterministic Policy Gradient Algorithm for Peer-To-Peer Energy Trading Considering Distribution Network Constraints", Aug. 2021, School of Computing and Mathematics, Keele University. (Year: 2021).*
Liang et al., "Agent-Based Modeling in Electricity Market Using Deep Deterministic Policy Gradient Algorithm", Nov. 2020, IEEE Transactions on Power Systems, vol. 35, No. 6. (Year: 2020).*
Qiu et al., "Deep Deterministic Policy Gradient (DDPG)-Based Energy Harvesting Wireless Communications", Oct. 2019, IEEE Internet of Things Journal, vol. 6, No. 5. (Year: 2019).*
Wang et al., "Actor-Critic based Deep Reinforcement Learning Framework for Energy Management of Extended Range Electric Delivery Vehicles", Jul. 2019, Proceedings of the 2019 IEEE/ASME International Conference on Advanced Intelligent Mechatronics. (Year: 2019).*
Zenginis et al., "Real-time energy management of a smart home based on deep deterministic policy gradient", 2021 IEEE. (Year: 2021).*
Zhou et al., "Deep Deterministic Policy Gradient With Prioritized Sampling for Power Control", Oct. 2020, IEEE Access. (Year: 2020).*
Xu et al., "Optimal operation of regional integrated energy system based on multi-agent deep deterministic policy gradient algorithm", 2022, The 5th International Conference on Electrical Engineering and Green Energy, CEEGE 2022. (Year: 2022).*
Zhang et al., "Multistep Multiagent Reinforcement Learning for Optimal Energy Schedule Strategy of Charging Stations in Smart Grid", Jul. 2023, IEEE Transactions on Cybernetics, vol. 53, No. 7. (Year: 2023).*
Zhang et al., "Cddpg: A Deep-Reinforcement-Learning-Based Approach for Electric Vehicle Charging Control", Mar. 2021, IEEE Internet of Things Journal, vol. 8, No. 5. (Year: 2021).*
Yang et al., "Application of a Deep Deterministic Policy Gradient Algorithm for Energy-Aimed Timetable Rescheduling Problem", Jul. 2019, Energies 2019, 12, 3461; doi: 10.3390/en12183461. (Year: 2019).*
Yang et al., "Hierarchical Deep Reinforcement Learning for Continuous Action Control", Nov. 2018, IEEE Transactions on Neural Networks and Learning Systems, vol. 29, No. 11. (Year: 2018).*
Xu et al., "soft actor-critic-based energy management strategy for electric vehicles with hybrid energy storage systems", 2022, Journal of Power Sources 524 (2022) 231099. (Year: 2022).*
Abdalla et al., "Integration of energy storage system and renewable energy sources based on artificial intelligence: An overview," Journal of Energy Storage, vol. 40, 2021, 102811, pp. 13.
Amini et al., "Optimal operation of interdependent power systems and electrified transportation networks," Energies, vol. 11, Issue 196, 2018, pp. 25.
Bagherinezhad et al., "Spatio-Temporal Visualization of Interdependent Battery Bus Transit and Power Distribution Systems," IEEE Power & Energy Society Innovative Smart Grid Technologies Conference (ISGT) IEEE, 2021, pp. 5.
Kang et al., "Autonomous electric vehicle sharing system design," Journal of Mechanical Design, vol. 139, Issue 1, 2017, 011402, pp. 11.

(56) References Cited

OTHER PUBLICATIONS

Wei et al., "Optimizing the spatio-temporal deployment of battery electric bus system," Journal of Transport Geography, vol. 68, 2018, pp. 160-168.
Zhou et al., "Bi-objective optimization for battery electric bus deployment considering cost and environmental equity," IEEE Transactions on Intelligent Transportation Systems, vol. 22, Issue 4, 2020, pp. 2487-2497.

* cited by examiner

300

HIERARCHICAL COMBINATION OF ARTIFICIAL INTELLIGENCE AND OPTIMIZATION FOR THE OPERATION OF POWER SYSTEMS

CROSS-REFERENCE TO RELATED APPLICATIONS

This application claims the benefit of and priority to 1) U.S. Provisional Patent Application Ser. No. 63/389,594 filed on Jul. 15, 2022 and entitled "REAL-TIME COORDINATED OPERATION OF POWER AND AUTONOMOUS ELECTRIC RIDE-HAILING SYSTEMS," and 2) U.S. Provisional Patent Application Ser. No. 63/394,818 filed on Aug. 3, 2022 and entitled "HIERARCHICAL COMBINATION OF ARTIFICIAL INTELLIGENCE AND OPTIMIZATION FOR THE OPERATION OF POWER SYSTEMS." The entire contents of each of the aforementioned applications and/or patents are incorporated by reference herein in their entirety.

GOVERNMENT RIGHTS

This invention was made with government support under grant DE-EE0008775 awarded by the Department of Energy. The government has certain rights in this invention.

BACKGROUND

The increasing inclusion of batteries, solar, wind, and various other relatively newer, green energy sources has introduced several challenges to modern power grid management. A multitude of problems need to be addressed in smart grid power management.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer systems, methods, and apparatus for hierarchical combination of artificial intelligence and optimization for the operation of power systems. In at least one embodiment, a computer system for real-time coordinated operation of power distribution systems and electric vehicles identifies a set of integrated hybrid resources (IHRs), wherein each IHR within the set of IHRs comprises one or more of: energy storage (ES) systems, solar generating units, electric vehicles (EVs), and/or inflexible loads. The computer system may then execute, at an IHR selected from the set of IHRs, a deep deterministic policy gradient (DDPG) algorithm, the DDPG algorithm utilizing a critic deep neural network and an actor deep neural network. The critic deep neural network estimates a Q-value of an action for a given state, and the actor deep neural network estimates a best action for the given state. Based upon an output of the DDPG algorithm, the computer system may generate a charging schedule for the ES systems and the EVs within the IHR.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Disclosed embodiments include a computer systems, methods, and apparatus for hierarchical combination of artificial intelligence and optimization for the operation of power systems. In at least one embodiment, a computer system for real-time coordinated operation of power distribution systems and electric vehicles identifies a set of integrated hybrid resources (IHRs), wherein each IHR within the set of IHRs comprises one or more of: energy storage (ES) systems, solar generating units, electric vehicles (EVs), and/or inflexible loads. The computer system may then execute, at an IHR selected from the set of IHRs, a deep deterministic policy gradient (DDPG) algorithm, the DDPG algorithm utilizing a critic deep neural network and an actor deep neural network. The critic deep neural network estimates a Q-value of an action for a given state, and the actor deep neural network estimates a best action for the given state. Based upon an output of the DDPG algorithm, the computer system may generate a charging schedule for the ES systems and the EVs within the IHR.

Figure 1:
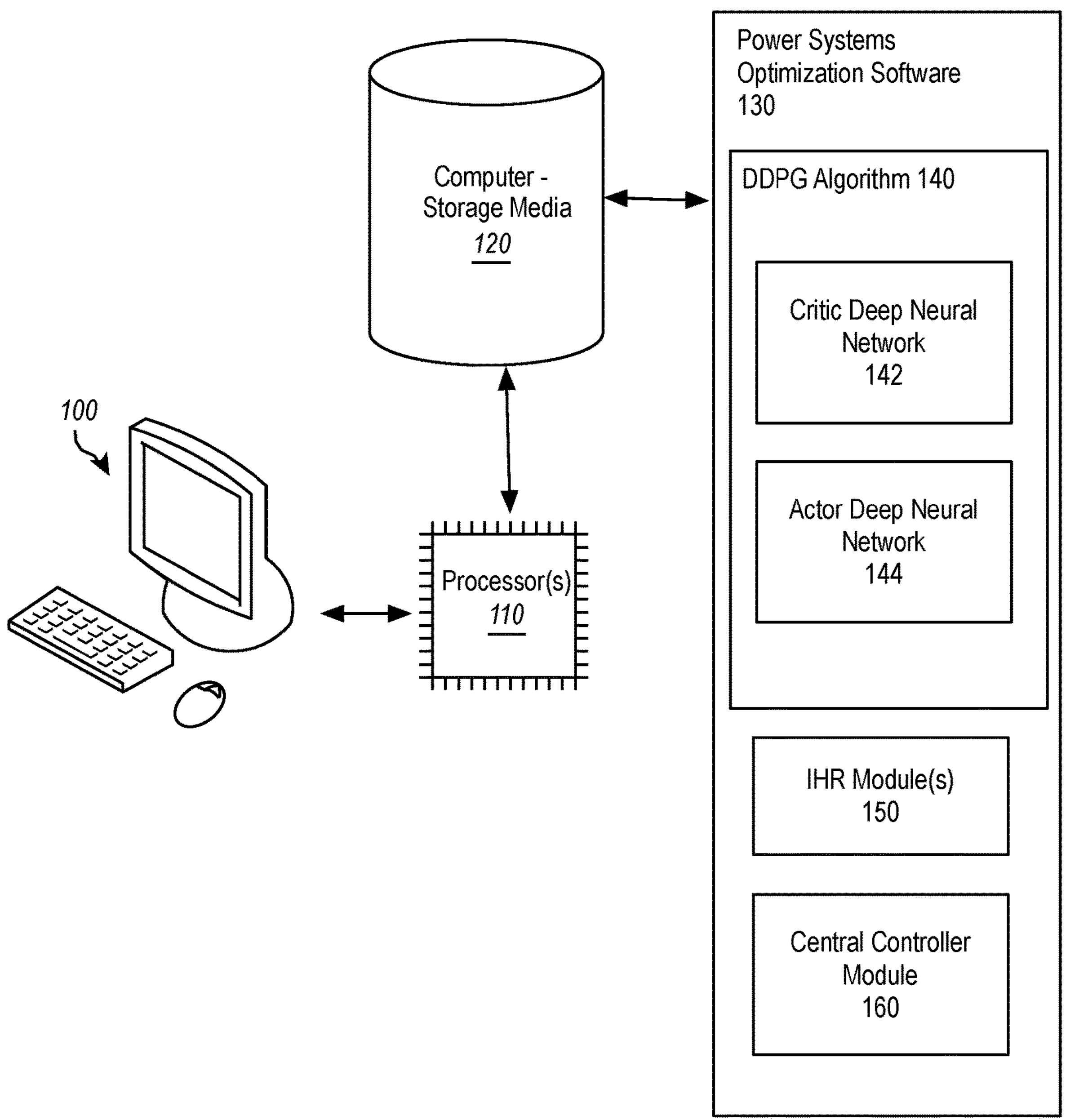
FIG. 1 depicts a schematic diagram of an example system for real-time coordinated operation of power distribution systems.

FIG. 1 depicts a schematic diagram of an example computer system 100 for real-time coordinated operation of power distribution systems. The depicted computer system 100 comprises one or more processors 110 and computer-storage media 120. The one or more processors 110 execute instructions that are stored on the computer-storage media 120. The one or more processors 110 and the computer-storage media 120 may be located locally, remotely, or distributed between local and remote systems.

The computer executable instructions stored on the computer-storage media 120 comprise a power systems optimization software application 130. The power systems optimization software 130 includes a DDPG algorithm 140 that is trained to optimize power systems. The DPPG algorithm 140 utilizes a critic deep neural network 142 and an actor deep neural network 144 as explained in greater detail below.

The power systems optimization software application 130 may further include both IHR module(s) 150 and a central controller module 160. The IHR module(s) 150 and the central controller module 160 are configured to interface and/or manage execution of instructions at the central controller and/or IHRs. In at least one embodiment, the instructions for the IHRs and central controller are executed locally. In additional or alternative embodiments, at least a portion of the executable instructions are located at a remote IHR and/or at a remote central controller.

High penetration of distributed energy resources (DERs) and electric vehicles (EVs) are key factors in decarbonizing the power grid and addressing climate change. The supporting policies and regulatory drivers encourage the power system operators to utilize responsive DERs instead of centralized bulk generation. For instance, Federal Energy Regulatory Commission (FERC) order 2222 enables DERs to participate in wholesale energy and ancillary service markets. Further, FERC defines a combination of DERs that are modeled and controlled like a single source as an integrated hybrid resource (IHR). Therefore, the emergent trend of replacing passive load and generation with active and responsive DERs (i.e., energy storage (ES) systems and solar generating units) and electric vehicles restructures the electric power grid paradigm and sheds light on the existing opportunities to deploy distributed energy flexibility via different energy management schemes.

Conventional models to integrate DERs and EVs in power system operation become computationally expensive and intractable as the number of DERs and EVs increases. More specifically, the real-time control and operation of a large number of DERs and EVs integrates the corresponding physical and operational constraints, which makes the existing energy management optimization models complex and obsolete. Therefore, adopting artificial intelligence engines to control the DERs and EVs in a decentralized manner is beneficial. However, the existing data-driven models, e.g., deep reinforcement learning, fall short of considering the physical constraints of the power distribution system to ensure the deliverability of the energy in the real-time operation.

Figure 2:
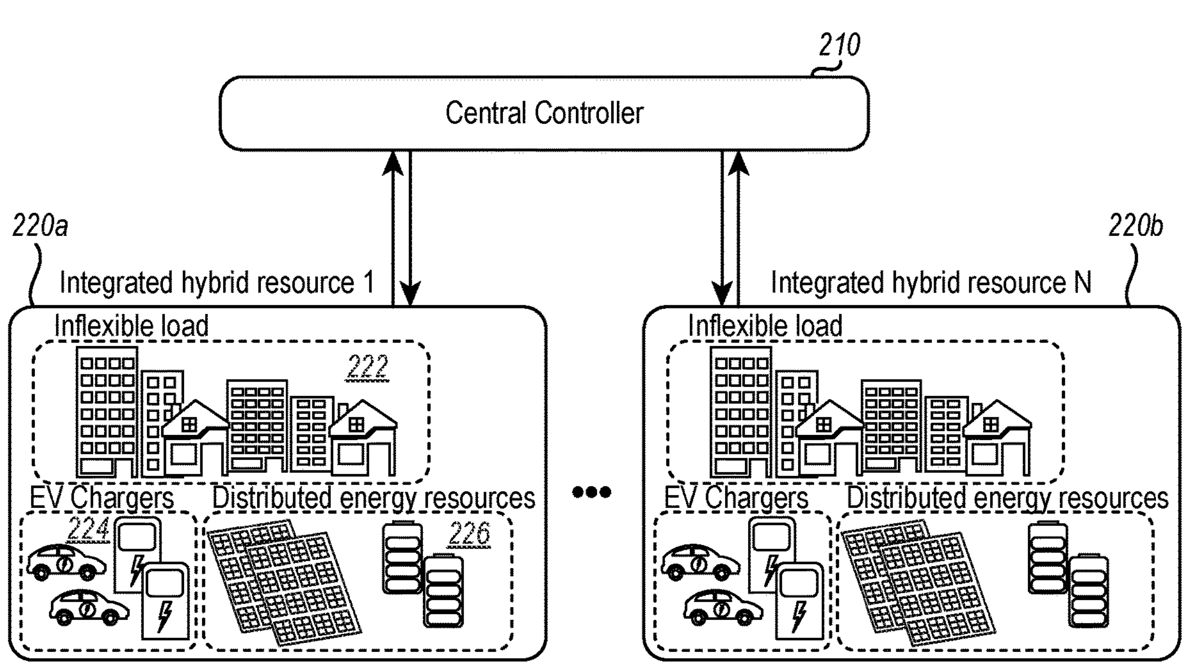
FIG. 2 depicts another schematic diagram of an example system for real-time coordinated operation of power distribution systems.

Disclosed embodiments include a hierarchical energy flexibility model to control the dispatch of IHRs in the real-time operation of power distribution systems. A schematic overview of the proposed real-time hierarchical energy flexibility model 200 is illustrated in FIG. 2. FIG. 2 depicts a central controller 210 in communication with multiple IHRs 220_a_, 220_b_. The depicted IHRs 220_a_, 220_b_ comprise inflexible loads 222, EV chargers 224, and distributed energy resources 226. In at least one embodiment, the disclosed system defines a set of ES systems, solar generating units, EVs, and inflexible load as an IHR, which can be controlled locally. The power distribution system is divided into I IHRs 220_a_, 220_b_, in which the IHR controller makes decision on charging and discharging of ES systems as well as charging of EV batteries based on the electricity price, solar generation, and inflexible load demand. The IHR controller calculates and sends the net active power as well as the maximum and minimum reactive power of the IHR (based on the energy dispatches of DERs) to central controller. The power distribution system central controller performs a high-level power flow analysis to determine the adjusted active power and reactive power setpoints while ensuring their deliverability in the real-time operation. The adjusted active power and reactive power setpoints are finally redistributed between DERs in each IHR 220_a_, 220_b_.

Disclosed embodiments include a hierarchical energy flexibility model for IHRs 220_a_, 220_b_ to determine the active and reactive dispatch of DERs and EVs in real-time operation of power distribution systems. Additional embodiments include a detailed model for IHR controller that adopts a deep reinforcement learning approach to enable scalable and integrated control of DERs and EVs locally, which eliminates the need for complicated and computationally expensive centralized models. Further embodiments include a computationally efficient central controller to ensure the feasibility and deliverability of the dispatched energy in the local controllers. More specifically, the proposed central controller incorporates physical constraints of the power distribution system and sends adjusted active and reactive power setpoints to IHR controllers. Disclosed embodiments also include a proposed data-driven model for the IHR controller that can be trained online to be adaptive to the changing factors in the real-time operation of power distribution systems.

In at least one embodiment, a real-time hierarchical energy flexibility model is composed of one central and multiple IHR controllers. The power distribution system is divided into multiple IHR zones, where each IHR 220_a_, 220_b_ contains inflexible loads, DERs, and EV chargers that are geographically close and connected to a set of power distribution buses. The IHR zones are determined such that the voltage deviation between different power distribution buses within an IHR does not exceed δ. Each IHR zone may contain an IHR controller that minimizes the local operation cost considering the energy price, inflexible load, quality of service constraints of EVs, and operational limits of DERs. The central controller, on the other hand, conducts an efficient power flow analysis, where each IHR 220_a_, 220_b_ is modeled as a single bus, to ensure the deliverability of the power and reliability of the power distribution system operation in real-time.

In at least one embodiment, the IHR controller determines the dispatch of DERs and EVs such that the operation cost of IHR in Equation 1 is minimized. In Equation 1, the terms $$P_t^z$$

and $\lambda_t$ denote the net active power of IHR and locational marginal price of electricity, respectively. More specifically, the IHR controller determines the delivered charging power of EVs as well as charging and discharging dispatches of ES systems with respect to operational constraints in Equation 2-Equation 5.

$$\min \sum_t P_t^z \lambda_t \quad \text{Equation 1}$$

The net active power of IHR is calculated in Equation 2. The terms $$P_t^D,\ P_{m,t}^M,\ P_{v,t}^V,\ P_{e,t}^{E,c},\text{ and }P_{e,t}^{E,d}$$

are respectively the inflexible load, active power generation of solar unit, the delivered charging power of EV, and the charging and discharging power dispatches of ES system.

$$P_t^e = P_t^D - \sum_{m\in\mathcal{M}^i} P_{m,t}^M + \sum_{v\in\mathcal{V}^i} P_{v,t}^V + \sum_{e\in\varepsilon^i}\left(P_{e,t}^{E,c} - P_{e,t}^{E,d}\right) \quad \text{Equation 2}$$

A queuing model is adopted to alter the charging demand of EVs temporally to capture the energy flexibility and minimize the operation cost of EVs such that the EV owner's quality of service is maintained. Let $A_{v,t}$ denote the requested charging power of EV $v\in V$ at time t. The state equation of the queuing model is delineated in Equation 3 where the accumulation of EV power request that is not served until time t forms the queue backlog. Thus, the queue backlog at time t, $O_{v,t}$, is equal to queue backlog at time t−1, plus the requested power minus the delivered power at time t. A deadline-based constraint is proposed in Equation 4 to ensure the EV owners' quality of service, in which $$t_v^D$$

is the deadline to meet the charging request of EV $v\in V$.

$$O_{v,t} = O_{v,t-1} + A_{v,t} - P_{v,t}^v, \forall t \quad \text{Equation 3}$$

$$O_{v,t} = 0,\ t = t_v^D \quad \text{Equation 4}$$

Solar generating units equipped with smart inverters can alter the active and reactive power such that the voltage and frequency issues of the power distribution system are alleviated and resolved. In Equation 5, the apparent power of the smart inverter of solar generating unit $m\in M$ at time t is capped by the maximum apparent power of the inverter, $$\overline{S_m^M},\text{ where }P_{m,t}^M\text{ and }Q_{m,t}^M$$

are the active and reactive power dispatches, respectively. In Equation 6, the active power of solar generating unit $m\in M$ at time t is confined by zero and the forecasted value of the solar generation, $$\overline{P_{m,t}^M}.$$

Equation 7 ensures that the power factor of solar generating unit m at time t is greater than the minimum acceptable power factor, $$\underline{pf}_m^M.$$

$${P_{m,t}^M}^2 + {Q_{m,t}^M}^2 \le \overline{S_m^M}^2, \forall m, t \quad \text{Equation 5}$$

$$0 \le P_{m,t}^M \le \overline{P_{m,t}^M}, \forall m, t \quad \text{Equation 6}$$

$$\underline{pf}_m^M \le \frac{P_{m,t}^M}{\sqrt{{P_{m,t}^M}^2 + {Q_{m,t}^M}^2}}, \forall m, t \quad \text{Equation 7}$$

The state equation of the ES system is denoted in Equation 8, where the state of charge (SOC) of ES system $e\in\varepsilon$ at time t is equal to SOC of ES system at time t−1, plus the charged energy, and minus the discharged energy at time t. The terms $\eta^c$ and $\eta^d$ are the charging and discharging efficiencies of the ES system, respectively.

$$E_{e,t} = E_{e,t-1} + \eta^c P_{e,t}^{E,c} - \frac{1}{\eta^d} P_{e,t}^{E,d}, \forall e, t \quad \text{Equation 8}$$

The reactive power at each IHR i is defined as the summation of reactive power required by the inflexible load and EVs minus the reactive power provided by the ES systems and solar generating units. The upper bound of active power in ES system is determined by its maximum charging and discharging capabilities, $$\bar{P}_e^E = \max\left(\bar{P}_e^{E,c}, \bar{P}_e^{E,d}\right).$$

In order to ensure the deliverability of reactive power when the active power reaches the maximum threshold in inverter-based resources, the apparent power capacity is considered larger than the maximum active power capacity. Hence, the system calculates the maximum and minimum reactive power thresholds of ES systems and solar generating units in Equation 9 and Equation 10, where the terms $$\underline{Q_e^E},\ \overline{Q_e^E},\ \underline{Q_m^M},\text{ and }\overline{Q_m^M}$$

respectively denote the minimum and maximum reactive power of ES systems and solar generating units.

$$\underline{Q_e^E} = -\sqrt{\overline{S_e^E}^2 - \overline{P_e^E}^2} \le Q_{e,t}^E \le \sqrt{\overline{S_e^E}^2 - \overline{P_e^E}^2} = \overline{Q_e^E}, \forall e, t \quad \text{Equation 9}$$

$$\underline{Q_m^M} = -\sqrt{\overline{S_m^M}^2 - \overline{P_m^M}^2} \le Q_{m,L}^M \le \sqrt{\overline{S_m^M}^2 - \overline{P_m^M}^2} = \overline{Q_m^M}, \forall m, t \quad \text{Equation 10}$$

The active power dispatches of ES systems and EVs, as well as the minimum and maximum thresholds of the reactive power at each IHR zone are calculated above. In order to ensure the deliverability of the scheduled dispatches for ES systems and EVs, the central controller of the power distribution system perform a power flow analysis, in which we add index $i\in\mathcal{I}$ to represent different IHR zones. The central controller can reduce the requested active power of each IHR $i\in\mathcal{I}$ by $$P_{i,t}^C$$

such that $$\tilde{P}_{i,t}^{z}=P_{i,t}^{z}-P_{i,t}^{C},\text{ where }\tilde{P}_{i,t}^{z}$$

is the adjusted active power. The central controller sends the adjusted active power and reactive power setpoints of the IHR, $$\tilde{P}_{i,t}^{z}\text{ and }Q_{i,t}^{z},$$

to the IHR controller. Then, the IHR controller tailors the charging and discharging dispatches of the ES systems, solar generating units, and the delivered charging power to EVs as a response to active and reactive power signals of the central controller.

The central controller in the power distribution system conducts the optimal power flow to ensure the deliverability of the requested power and determines the required reactive power at each IHR. The IHRs and connecting lines in the power distribution system are respectively denoted by I and $\mathcal{L}$, where (k, i, j)$\in \mathcal{I}$ are three consecutive IHRs. The objective function of the central controller in Equation 11 minimizes the cost of power drawn from the upstream transmission system in the first term while penalizing the curtailed power at each IHR by a large factor in the second term, $\lambda^{p}$.

$$\min\sum_{t\in T}P_{t}^{G}\lambda_{t}+\sum_{t\in T}\sum_{i\in\mathcal{I}}P_{i,t}^{C}\lambda^{p} \qquad \text{Equation 11}$$

While the central controller solves a high-level and efficient optimization problem, IHR controllers solve the problem for multiple DERs and numerous EVs, resulting in a computationally expensive and slow solution. As such, a reinforcement learning (RL) framework may be adopted to articulate the IHR controllers' decision-making process. To this end, the operation of the IHR controller may be modeled by a Markov Decision Process (MDP), which represents the state evolution of the system at the local level.

In at least one embodiment, the MDP is modeled by a tuple ($\mathcal{S},\mathcal{A},\mathcal{P},\mathcal{R},$, $\gamma$), which is defined for the proposed problem as follows:

State space: The state representation at time t comprises the state spaces of the ES system and EVs shown by $s_t\in$ S and is defined as:

$$s_{t}=\left(P_{t}^{D},P_{t}^{G},\lambda_{t},I_{t},(1-I_{t})E_{t},I_{t}T^{D},I_{t}E_{t}^{r}\right) \qquad \text{Equation 12}$$

where $$P_{t}^{D},P_{t}^{G},$$

represent the vectors of inflexible load and solar generation power, respectively, and $\lambda_t$ is the real-time electricity price. In order to form an inclusive state space to contain both ES systems and EVs, here we form an identification (1×X)-vector $I_t=[I_{x,t}]$, where X is the total number of ES systems and EVs. The component of the identification vector, $I_{x,t}$ is equal to 0 if it represents an ES system, and is 1 otherwise. The proposed identification vector modifies the state space such that the agent can differentiate between the ES system and EVs and make decisions accordingly. The vector $E_t=[E_{x,t}]$ represents the SOC of ES systems, and is multiplied element-wise by $(1-I_t)$ to become zero for EVs. The departure and remaining requested energy of EVs are respectively denoted by $$T^{D}=\left[T_{x}^{D}\right]\text{ and }E_{t}^{r}=\left[E_{x,t}^{r}\right],$$

and are multiplied element-wise by $I_t$ which sets the last two state parameters to zero for ES systems.

Action space: The collective action of ES systems and EVs in system state s t forms the action $$a_{t}=\left[a_{t}^{1},a_{t}^{2},\ldots,a_{t}^{X}\right]\in\mathcal{A},\text{ where }A_{a}a_{t}^{X}$$

is a continuous variable. The first action $$a_{t}^{1}$$

represents the output of the ES system and is limited on both ends by maximum discharging and charging capacities. The rest of actions, $$a_{t}^{X},\ \forall\, x>1,$$

are continuous actions for charging EVs and are limited to the maximum charging capacity of the charging plug at the station.

Reward: The actions taken by the IHR controller for ES systems and EVs, $\alpha_t\in\mathcal{A}$, reshapes the system state from $s_t$ to $s_{t+1}\in\mathcal{S}$, and consequently allocate a reward, r t, to the controller. The structure of the reward function may be designed such that actions are better guided towards the optimal direction. The reward function is presented in Equation 13, in which $\omega_i$ are weighting coefficients, and $\tilde{\lambda}$ is the predicted average price of electricity for the next 24 hours. In the first line in Equation 13 the reward foe ES systems is delineated, where it receives a positive reward for discharging when the energy price is above average and negative reward otherwise. However, no negative reward is allocated when the ES system is charged by local solar generation. In the second line the EVs receive a positive reward if the batteries charge when the electricity price is lower than average, and a negative reward otherwise. Further, the EV agent receives a negative reward proportional to the remaining requested energy before the deadline, and a large positive reward if the agent meets all the requested charging demand by the deadline.

$$r_{t}(s_{t},a_{t})=\sum_{e\in\varepsilon}\omega_{1}\left(\max\left\{0,P_{e,t}^{E,c}-P_{m,t}^{M}\right\}-P_{e,t}^{E,d}\right)\left(\tilde{\lambda}-\lambda_{t}\right)+\sum_{v\in\mathcal{V}}\omega_{2}P_{v,t}^{V}\left(\tilde{\lambda}-\lambda_{t}\right)- \qquad \text{Equation 13}$$

-continued $$\omega_3 E_{v,t}^{V}|_{t\neq t_D} + \omega_4|_{t=t_D,E_{v,t}^{V}=0}$$

Transition: The transition probability characterizes the stochastic dynamic of the system in which the probability of going from state to $s_t \in \mathcal{S}$ to $s_{t+1} \in \mathcal{S}$ through action $\alpha_t$ is defined by $\mathcal{P}: \mathcal{S} \times \mathcal{A} \times \mathcal{S} \rightarrow [0,1]$. The unknown transition probability is obtained through observing voluminous transitions in the reinforcement learning framework.

In at least one embodiment, the model maximizes the reward of all agents (i.e., ES systems and EVs), which minimizes the operation cost of the maximizes the self-sufficiency of the IHR in the power distribution system while maintaining the operational constraints of the ES system and the EV owners' quality of service. To this end, Equation 14 can be maximized as follows:

$$\max_{a_t \in \mathcal{A}} \mathbb{E}\left[\sum_{t=1}^{\infty} \gamma^t [r_t(s_t, a_t)] | s = s_0\right] \quad \text{Equation 14}$$

The term $\gamma \in [0, 1]$ represents the discount factor of the model in which lower values encourage myopic behavior to maximize the short-term rewards, while higher values enable the agents to have a more forward-looking approach.

In additional or alternative embodiments, a deep deterministic policy gradient (DDPG) method may be used. The deep deterministic policy gradient (DDPG) method is a model free actor-critic algorithm which is presented in this subsection. In the DDPG model the actions are taken and evaluated respectively by the actor and critic networks to establish the optimal action policies in continuous action space. The Bellman equation is utilized to recursively estimate the long-term value or Q-value, $Q(s_t, \alpha_t)$, for action $\alpha_t$ at state $s_t$:

$$Q(s_t, a_t) = r(s_t, a_t) + \gamma \, \mathbb{E}\left[\max_{a_{t+1} \in \mathcal{A}_{t+1}} Q(s_{t+1}, a_{t+1})\right] \quad \text{Equation 15}$$

Since the total number of states and actions in the continuous space is infinite, the DDPG algorithm utilizes two deep neural networks, also known as critic and actor networks, to evaluate the long-term values and find the best action. The actor network, $\mu(s_t; \theta^\mu)$, is trained to capture a deterministic policy for estimating the best action in states t, while critic network $Q(s_t, \alpha_t, \theta^Q)$ estimates the Q-value of action $\alpha_t$ given state $s_t$. Given the deterministic policy of actor network, $\mu(s_t; \theta^\mu)$, and instantaneous state $s_t$ the Q-value of the trained networks is estimated in Equation 16 where the terms $\theta^\mu$, $\theta^Q$ are weight vectors of the two networks.

$$Q(s_t, a_t) \approx r(s_t, a_t) + \gamma \mathbb{E}\left[Q\left(s_{t+1}, \mu(s_{t+1}; \theta^\mu); \theta^Q\right)\right] \quad \text{Equation 16}$$

In the simultaneous training process of the actor and critic networks, the actor network makes action based on the sampled system state, $s_t$, while the critic network evaluates the given samples, $s_t$, $\alpha_t = \mu(s_t; \theta^\mu)$, and calculates the reward, $r_t$, and consequently improves the actor network.

In at least one embodiment of a Deep Reinforcement Learning model (DRL), the agent needs to make a collective decision $$a_t = \left[a_t^1, a_t^2, \ldots, a_t^X\right]$$

for all EVs and ES system within an IHR. Assuming each action $$a_t^X$$

belongs to the action space $\mathcal{A}_x$, the size of collective action space is $$\Pi_1^X |\mathcal{A}_x|,$$

which is the complexity of Q-value computation and hence, a large collective action can make the training too slow and inefficient. To overcome this hurdle, in at least one embodiment, the system reformulates the state evolution by breaking down the collective action of all ES system and EVs into X single actions (X being the total number of EVs and ES systems) and create X−1 intermediate states as $$(s_t, a_t^1), (s_t, a_t^1, a_t^2), \ldots, (s_t, a_t^1, \ldots, a_t^{X-1}).$$

By doing so, the actions are taken sequentially rather than collectively, and each action is taken after its predecessors' actions are known. This reformulation reduces the complexity of Q-value computation from $$\prod_1^X |\mathcal{A}_x| \text{ to } \sum_1^X |\mathcal{A}_x|.$$

Accordingly, the reward function in Equation 13 will be modified to include the reward of taking action in the intermediate state, however, the total reward will be the same as the original problem. The new reward function is:

$$r_t(s_t, a_t) = \omega_1\left(\max\left\{0, P_{e,t}^{E,c} - P_{m,t}^{M}\right\} - P_{e,t}^{E,d}\right)\left(\tilde{\lambda} - \lambda_t\right) + \omega_2 P_{v,t}^{V}\left(\tilde{\lambda} - \lambda_t\right) - \omega_3 E_{v,t}^{V}|_{t\neq t_D} + \omega_4 |_{t=t_D,E_{v,t}^{V}=0}^{V} \quad \text{Equation 17}$$

Figure 3:
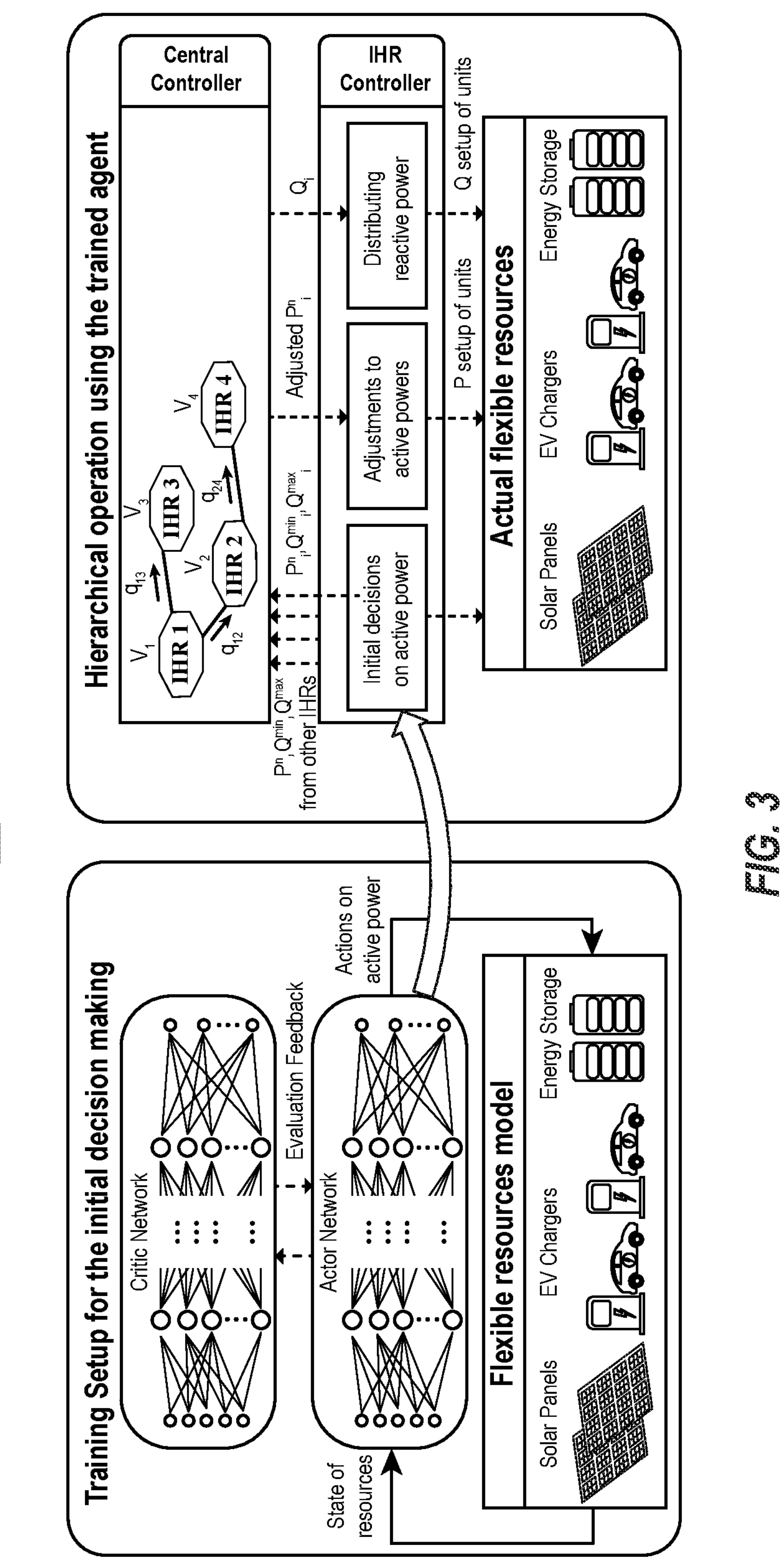
FIG. 3 depicts another schematic diagram of an example system for real-time coordinated operation of power distribution systems.

The DDPG agent, once trained, makes the initial decisions for the charging schedule of ES systems and EVs in its IHR. The interaction of IHR and central controllers are shown as a schematic 300 in FIG. 3, where the trained IHR controller is directly applied to make the initial decision on active power of DERs and EVs, and when the decisions are adjusted by the central controller, distributes them among resources within its zone.

In at least one embodiment, the proposed DRL model is responsive to electricity price, which allows taking advantage of the offered flexibility by ES systems, solar generating units, and EVs to reduce the operation cost of IHRs and consequently the power distribution system. The optimization model integrates all the physical constraints of DERs and EVs to minimize the operation cost of the power distribution system in a centralized manner, which results in the lowest operation cost.

Additionally, in at least one embodiment, the proposed DRL-trained controller defers the requested charging demand of EVs in response to the electricity price to reduce the charging cost. Further, the controller discharges the ES systems when the electricity price is higher than average in pursuit of higher profit, while charging the batteries when the electricity price is lower than average or solar generation is available. The positive and negative components of the delivered power minus the requested power in $$EV, F_{v,t}^{+} - F_{v,t}^{-} = P_{v,t}^{-A_{v,t},}$$

as well as the charging minus discharging power of ES system, $$F_{e,t}^{+} - F_{e,t}^{-} = P_{e,t}^{E,c} - P_{e,t}^{E,d},$$

are defined as the positive and negative flexibility offered by EVs and ES systems, respectively. The positive flexibility refers to meeting the charging demand of EVs and charging the ES system batteries, while the negative flexibility denotes deferring the charging demand of EVs and discharging the ES system batteries. The EVs and ES systems charge the batteries when the electricity price is low and solar generation is available, while batteries are discharged later at night when the electricity price is high and there is no solar generation. Characterizing the positive and negative flexibility of EVs and DERs by IHR controller enables the power distribution operator to use the offered flexibility to ensure a reliable operation and participate in the wholesale electricity market to make profit.

Figure 4:
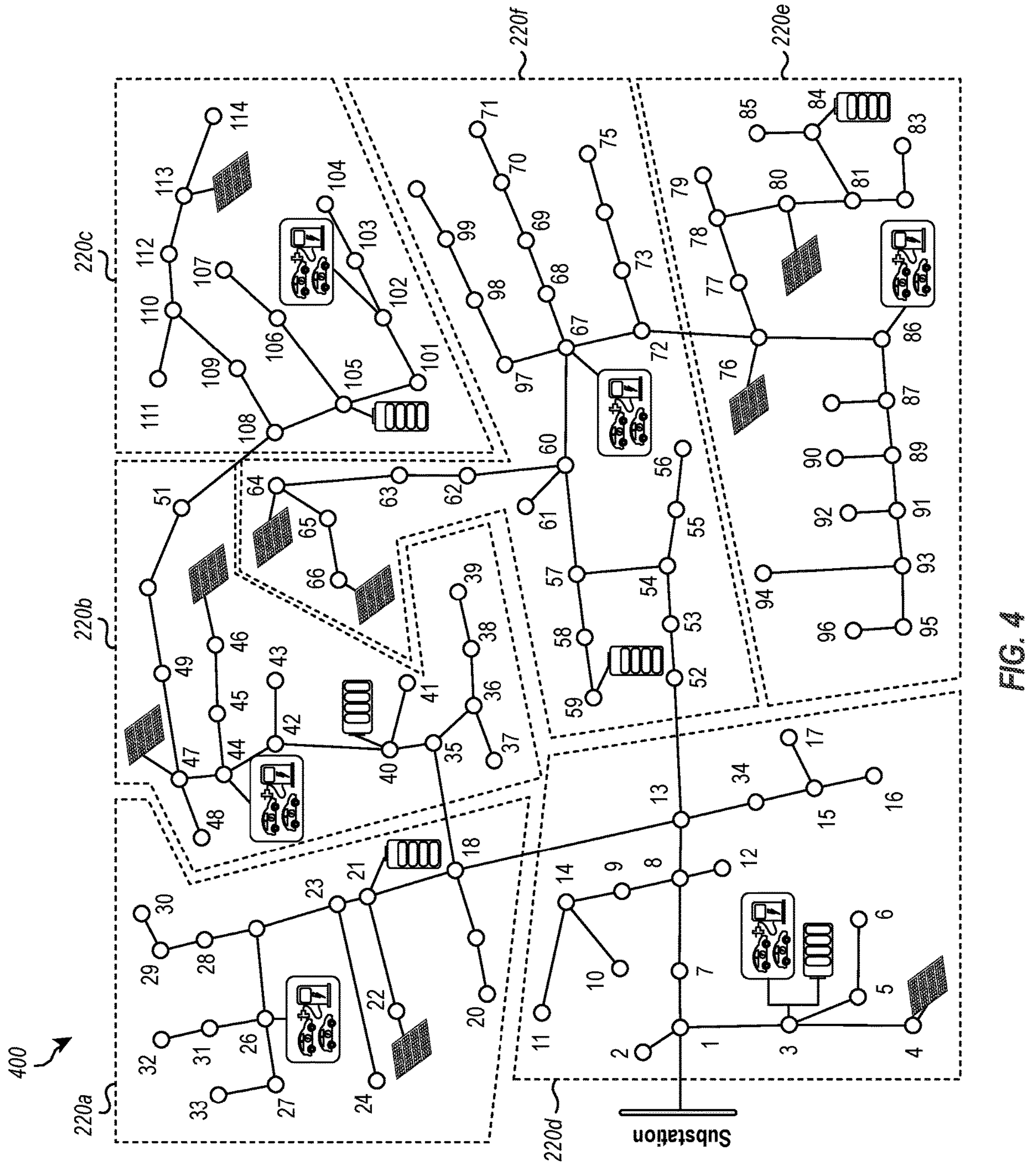
FIG. 4 depicts a map of an example power distribution system divided into IHRs.

FIG. 4 depicts a map of an example power distribution system 400 divided into IHRs 220(*a-f*). As depicted the IHRs 220(*a-f*) may be linked to each other and to a substation 410. The central controller 210 may be positioned at the substation 410, distributed among processors 110 within the IHRs 220(*a-f*), or located remotely from the power distribution system 400.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
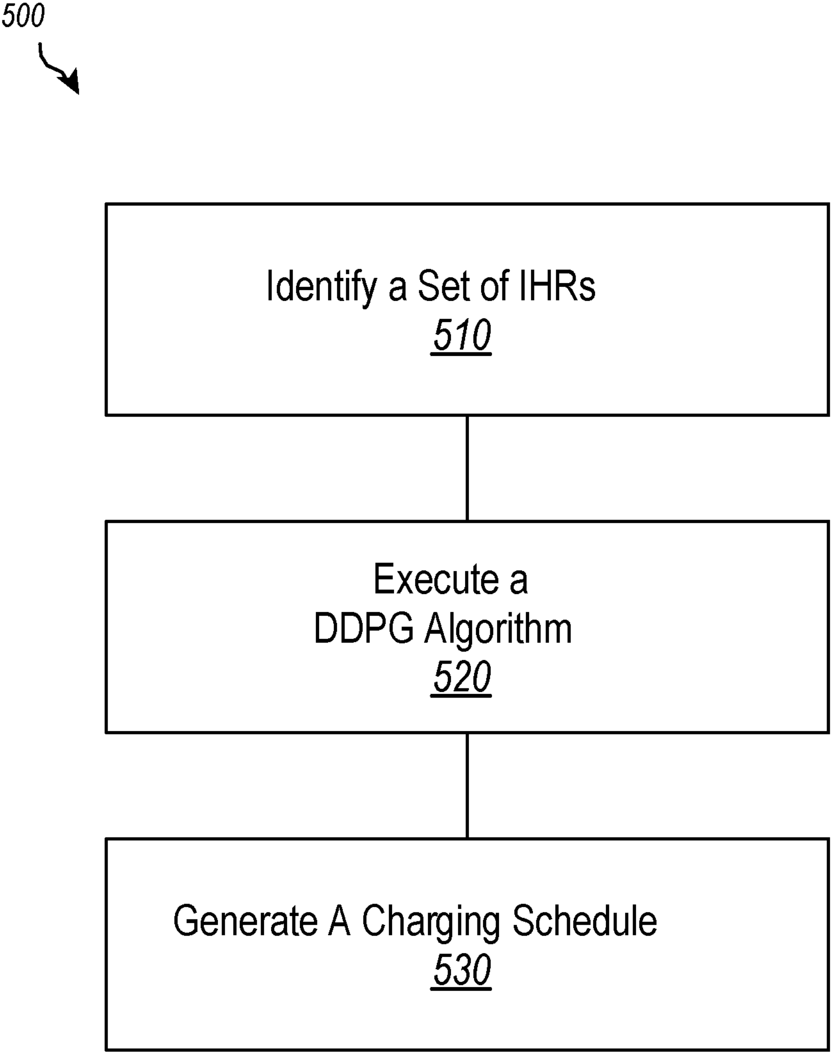
FIG. 5 illustrates a flow chart of steps in a method for real-time coordinated operation of power distribution systems.

Referring now to FIG. 5, a method 500 is illustrated. Method 500 includes various steps within a computer-implemented method, executed on one or more processors, for real-time coordinated operation of power distribution systems. For example, step 510 comprises identifying a set of IHRs. Step 150 further includes identifying a set of integrated hybrid resources (IHRs), wherein each IHR within the set of IHRs comprises one or more of: energy storage (ES) systems, solar generating units, electric vehicles (EVs), and/or inflexible loads. For example, FIG. 4 depicts an example power distribution system 400 divided into IHRs 220(*a-f*).

Additionally, method 500 comprises an act 520 of executing an DDPG algorithm. Act 520 further includes executing, at an IHR selected from the set of IHRs, a deep deterministic policy gradient (DDPG) algorithm, the DDPG algorithm utilizing a critic deep neural network and an actor deep neural network, wherein: the critic deep neural network estimates a Q-value of an action for a given state, and the actor deep neural network estimates a best action for the given state. For example, the computer system 100 of FIG. 1 comprises a DDPG algorithm 140 that utilizes a critic deep neural network 142 and an actor deep neural network 144 for real-time coordinated operation of power distribution systems.

Further, method 500 comprises an act 530 of generating a charging schedule 530. Act 530 further includes based upon an output of the DDPG algorithm, generating a charging schedule for the ES systems and the EVs within the IHR. For example, the system may create a queue of EV charging in order to optimize costs within the power distribution systems.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for real-time coordinated operation of power distribution systems, comprising:

one or more processors; and one or more computer-readable media having stored thereon executable instructions that when executed by the one or more processors configure the computer system to:

identify a set of integrated hybrid resources (IHRs), wherein each IHR within the set of IHRs comprises one or more of: energy storage (ES) systems, solar generating units, electric vehicles (EVs), and/or inflexible loads, and is electrically coupled to one or more of the power distribution systems via one or more distribution buses;

execute, at an IHR selected from the set of IHRs, a deep deterministic policy gradient (DDPG) algorithm, the DDPG algorithm utilizing a critic deep neural network and an actor deep neural network, wherein:

the critic deep neural network estimates a Q-value of an action for a given state, and the actor deep neural network estimates a best action for the given state, wherein the given state is based on a state-of-charge of the ES systems, an inflexible load vector, a solar generation power vector, departure and remaining requested energy of the EVs, and a real-time electricity price;

based upon an output of the DDPG algorithm, generate a charging schedule for the ES systems and the EVs within the IHR; and perform a power flow analysis to determine adjusted active power and reactive power setpoints while ensuring deliverability in real-time operation, wherein the charging schedule specifies active and reactive power dispatch values that control charging and discharging of the ES systems and charging of the EVs in response to the real-time electricity price, and wherein the adjusted active power and reactive power setpoints are distributed between distributed energy resources in each IHR.

2. The computer system as recited in claim 1, wherein the DDPG algorithm is responsive to electricity price.

3. The computer system as recited in claim 2, wherein the DDPG algorithm defers a requested charging demand of the EVs in response to the electricity price to reduce a charging cost.

4. The computer system as recited in claim 2, wherein the DDPG algorithm discharges the ES systems when the electricity price is higher than average.

5. The computer system as recited in claim 1, wherein the executable instructions include instructions that are executable to configure the computer system to:

create, at the IHR, a queue to alter charging of the EVs, wherein the queue is created to minimize an operation cost of EVs.

6. The computer system as recited in claim 1, wherein the executable instructions include instructions that are executable to configure the computer system to:

generate, at the IHR, actions of the ES systems and EVs sequentially such that an action is taken after its predecessors' actions are known.

7. A computer-implemented method, executed on one or more processors, for real-time coordinated operation of power distribution systems, comprising:

identifying a set of integrated hybrid resources (IHRs), wherein each IHR within the set of IHRs comprises one or more of: energy storage (ES) systems, solar generating units, electric vehicles (EVs), and/or inflexible loads, and is electrically coupled to one or more of the power distribution systems via one or more distribution buses;

executing, at an IHR selected from the set of IHRs, a deep deterministic policy gradient (DDPG) algorithm, the DDPG algorithm utilizing a critic deep neural network and an actor deep neural network, wherein:

the critic deep neural network estimates a Q-value of an action for a given state, and the actor deep neural network estimates a best action for the given state, wherein the given state is based on a state-of-charge of the ES systems, an inflexible load vector, a solar generation power vector, departure and remaining requested energy of the EVs, and a real-time electricity price;

based upon an output of the DDPG algorithm, generating a charging schedule for the ES systems and the EVs within the IHR; and performing a power flow analysis to determine adjusted active power and reactive power setpoints while ensuring deliverability in real-time operation, wherein the charging schedule specifies active and reactive power dispatch values that control charging and discharging of the ES systems and charging of the EVs in response to the real-time electricity price, and wherein the adjusted active power and reactive power setpoints are distributed between distributed energy resources in each IHR.

8. The computer-implemented method as recited in claim 7, further comprising:

creating, at the IHR, a queue to alter charging of the EVs, wherein the queue is created to minimize an operation cost of EVs.

9. The computer-implemented method as recited in claim 7, further comprising:

generating, at the IHR, actions of the ES systems and EVs sequentially such that an action is taken after its predecessors' actions are known.

10. The computer-implemented method as recited in claim 7, wherein the DDPG algorithm is responsive to electricity price.

11. The computer-implemented method as recited in claim 10, wherein the DDPG algorithm defers a requested charging demand of the EVs in response to the electricity price to reduce a charging cost.

12. The computer-implemented method as recited in claim 11, wherein the DDPG algorithm discharges the ES systems when the electricity price is higher than average.

13. A computer system for real-time coordinated operation of power distribution systems, comprising:

a central controller configured to ensure a feasibility and deliverability of dispatched energy in a set of integrated hybrid resources (IHRs);

the set of IHRs;

one or more processors; and one or more computer-readable media having stored thereon executable instructions that when executed by the one or more processors configure the computer system to:

identify the set of IHRs, wherein each IHR within the set of IHRs comprises one or more of: energy storage (ES) systems, solar generating units, electric vehicles (EVs), and/or inflexible loads, and is electrically coupled to one or more of the power distribution systems via one or more distribution buses;

execute, at an IHR selected from the set of IHRs, a deep deterministic policy gradient (DDPG) algorithm, the DDPG algorithm utilizing a critic deep neural network and an actor deep neural network, wherein:

the critic deep neural network estimates a Q-value of an action for a given state, and the actor deep neural network estimates a best action for the given state, wherein the given state is based on a state-of-charge of the ES systems, an inflexible load vector, a solar generation power vector, departure and remaining requested energy of the EVs, and a real-time electricity price;

based upon an output of the DDPG algorithm, generate a charging schedule for the ES systems and the EVs within the IHR; and perform a power flow analysis to determine adjusted active power and reactive power setpoints while ensuring deliverability in real-time operation, wherein the charging schedule specifies active and reactive power dispatch values that control charging and discharging of the ES systems and charging of the EVs in response to the real-time electricity price, and wherein the adjusted active power and reactive power setpoints are distributed between distributed energy resources in each IHR.

* * * * *